(12) United States Patent
Banerjee et al.

(10) Patent No.: US 8,260,645 B2
(45) Date of Patent: Sep. 4, 2012

(54) TRANSACTION RECURRENCE ENGINE

(75) Inventors: Sudeshna Banerjee, Waxhaw, NC (US);
Shiba Madaan, Charlotte, NC (US);
Sreedevi Gummuluri, Charlotte, NC (US); Debashis Ghosh, Charlotte, NC (US); Thayer S. Allison, Jr., Charlotte, NC (US); Kurt D. Newman, Matthews, NC (US); David Joa, Irvine, CA (US)

(73) Assignee: Bank of America Corporation, Charlotte, NC (US)

( * ) Notice: Subject to any disclaimer, the term of this patent is extended or adjusted under 35 U.S.C. 154(b) by 297 days.

(21) Appl. No.: 12/430,475

(22) Filed: Apr. 27, 2009

(65) Prior Publication Data
US 2010/0250338 A1 Sep. 30, 2010

Related U.S. Application Data

(63) Continuation-in-part of application No. 12/413,324, filed on Mar. 27, 2009, now Pat. No. 7,783,515.

(51) Int. Cl.
*G06Q 10/00* (2012.01)
*G06F 17/00* (2006.01)
*G06G 7/00* (2006.01)

(52) U.S. Cl. ............. 705/7.11; 705/7.12; 705/7.29; 705/30; 705/400

(58) Field of Classification Search .......... 705/7.11, 705/7.12, 7.29, 30, 35, 400
See application file for complete search history.

(56) References Cited

U.S. PATENT DOCUMENTS

| | | | |
|---|---|---|---|
| 5,739,512 A | 4/1998 | Tognazzini | |
| 5,974,396 A | 10/1999 | Anderson et al. | |
| 6,129,274 A * | 10/2000 | Suzuki | 235/381 |
| 6,394,341 B1 | 5/2002 | Mäkipää et al. | |
| 6,487,540 B1 | 11/2002 | Smith et al. | |
| 7,013,290 B2 | 3/2006 | Ananian | |
| 7,693,771 B1 * | 4/2010 | Zimmerman et al. | 705/36 R |
| 2002/0062249 A1 | 5/2002 | Iannacci | |
| 2002/0116249 A1 | 8/2002 | Ellinger et al. | |
| 2002/0152123 A1 | 10/2002 | Giordano et al. | |
| 2002/0188561 A1 | 12/2002 | Schultz | |
| 2003/0018550 A1 | 1/2003 | Rotman et al. | |
| 2003/0182204 A1 | 9/2003 | Rhee | |
| 2003/0217005 A1 | 11/2003 | Drummond et al. | |
| 2004/0220964 A1 | 11/2004 | Shiftan et al. | |
| 2006/0289621 A1 | 12/2006 | Foss, Jr. et al. | |
| 2006/0293956 A1 | 12/2006 | Walker et al. | |
| 2007/0069013 A1 | 3/2007 | Seifert et al. | |

(Continued)

OTHER PUBLICATIONS

PayPal Introduces New Micropayments Pricing to Increase the Convenience of Purchasing Digital Goods. Business Wire, p NA Aug. 31, 2005.*
U.S. Appl. No. 12/234,167, filed Sep. 19, 2008.
U.S. Appl. No. 12/413,324, filed Mar. 27, 2009.
U.S. Appl. No. 12/418,941, filed Apr. 6, 2009.

(Continued)

*Primary Examiner* — Scott Zare
(74) *Attorney, Agent, or Firm* — Michael A. Springs; Moore & Van Allen, PLLC; Padowithz Alce

(57) ABSTRACT

Embodiments of the present invention relate apparatuses and methods that allow a financial institution to monitor, group, and store customer transaction data and determine market information therefrom according to recurrence patterns. For example, in one embodiment a financial institution uses a computerized apparatus to monitor recurrences in financial transactions across a plurality of financial accounts maintained by the financial institution for a plurality of different customers, where the computerized apparatus is configured to automatically track recurrences in transaction data.

34 Claims, 5 Drawing Sheets

U.S. PATENT DOCUMENTS

| | | | |
|---|---|---|---|
| 2007/0219865 A1* | 9/2007 | Leining | 705/14 |
| 2007/0244741 A1 | 10/2007 | Blume et al. | |
| 2008/0091528 A1 | 4/2008 | Rampell et al. | |
| 2008/0133325 A1 | 6/2008 | De et al. | |
| 2008/0162279 A1 | 7/2008 | Hershkovitz et al. | |
| 2009/0222319 A1* | 9/2009 | Cao et al. | 705/10 |
| 2009/0234708 A1* | 9/2009 | Heiser et al. | 705/10 |
| 2009/0276346 A1* | 11/2009 | Rukonic et al. | 705/35 |
| 2010/0217701 A1* | 8/2010 | Mesilaty | 705/35 |
| 2011/0282791 A1* | 11/2011 | Anderson | 705/44 |

OTHER PUBLICATIONS

International Search Report and the Written Opinion of the International Searching Authority mailed May 19, 2010 for International Application No. PCT/US 10/28846.

International Search Report and the Written Opinion of the International Searching Authority mailed May 27, 2010 for International Application No. PCT/US 10/028828.

* cited by examiner

|  | Number of Unique Households | Amount Spent ( $ MM) |
|---|---|---|
| August 2008 | 1,058,560 (~35% increase over Aug 2007) | $ 20 (~26% increase over Aug 2007) |
| January 2008 | 933,300 | $ 18 |
| August 2007 | 786,020 | $ 15 |

Figure 4

TRANSACTION RECURRENCE ENGINE

CROSS-REFERENCE TO RELATED APPLICATION

This application is a continuation-in-part of co-pending patent application Ser. No. 12/413,324, filed Mar. 27, 2009, the entire disclosure of which is incorporated herein by reference.

FIELD

In general, embodiments of the present invention relate to apparatuses and methods for monitoring market data and determining useful information therefrom.

BACKGROUND

The availability of information drives much of today's business. For example, information about consumer, merchant, and product trends and preferences can be useful for many businesses. Unfortunately, access to such information can be difficult, if not impossible, to obtain using traditional systems and methods. For example, sending surveys to consumers and hiring market researchers can be expensive and yield inaccurate and quickly-outdated results, especially if a business is trying to obtain market data in a very narrow and specific area. Accordingly, it would be desirable if an apparatus and/or method could assist in monitoring and analyzing market data accurately and efficiently, and assist in presenting the data and information about the data to the requester in an easy to understand fashion.

BRIEF SUMMARY OF EMBODIMENTS OF THE INVENTION

Embodiments of the present invention address the above needs and/or achieve other advantages by providing apparatuses (e.g., a system, computer program product, and/or other device), methods, or a combination of the foregoing for monitoring market data and determining useful information therefrom.

More particularly, embodiments of the invention provide an apparatus comprising: (1) a transaction processing engine configured to process financial transactions involving a plurality of financial accounts owned by a plurality of different individuals; and (2) a transaction recurrence engine configured to monitor the financial transactions, track transaction recurrences occurring amongst the financial institutions, and provide output based on the transaction recurrences.

In one embodiment, the market research system apparatus further comprises a memory having information about the plurality of financial accounts store therein, wherein the plurality of financial accounts comprises a plurality of bank accounts. In another embodiment, the market research system's output is updated based on new transactions in real time or near real time. In a further embodiment, the market research system's transaction recurrence engine is configured to analyze the market data and provide business strategy recommendations to a user based on the analysis of the market data.

In one embodiment, the market research system's transaction recurrence engine is configured to monitor the financial transactions, group the financial transactions based on one or more transaction characteristics, and provide market data based on the grouping of the financial transactions. In another embodiment of the invention, the one or more transaction characteristics comprise product type, product brand, merchant, transaction amount or consumer demographic. In another embodiment of the invention, the market research system's transaction recurrence engine is configured to compare one or more transaction recurrence characteristics of a first group of financial transactions with the one or more transaction recurrence characteristics of a second group of financial transactions. In another embodiment of the invention, the one or more transaction recurrence characteristics comprise total revenue, transaction frequency, or consumer demographic.

In one embodiment, the transaction recurrences are tracked as a function of total revenue, transaction frequency, or consumer demographic. In another embodiment, the market research system's transaction recurrence engine is configured to receive user input and provide output based at least partially on the user input. In another embodiment of the invention, the market research system's transaction recurrence engine is configured to receive user input from and provide output to users having a subscription to a transaction recurrence engine service.

In one embodiment, the market research system's transaction recurrence engine is configured to identify market trends or natural clusters of transaction recurrences based on transaction recurrence data and one or more rules store in a memory, and wherein the output is based at least partially on the identified market trends or natural clusters of transaction recurrences. In a further embodiment, the market research system's transaction recurrence engine is configured to provide a user with a graphical user interface and use the graphical user interface to display output in the form of a graph, chart, or table.

In one embodiment, the output comprises an indication that at least one of the plurality of different individuals is likely to take a certain action, and wherein the indication is based at least partially on the transaction recurrences. In another embodiment, the output comprises an indication of a partnership or co-branding opportunity, wherein the indication is based at least partially on the transaction recurrences. In another embodiment, the output comprises an indication of a payment optimization opportunity with a particular merchant wherein the indication is based at least partially on the transaction recurrences. In yet another embodiment, the output comprises a suggested payment schedule for interchange payments with a particular merchant wherein the payment schedule is based at least partially on the transaction recurrences.

In one embodiment, the market research system apparatus further comprises a memory and a processor communicably coupled to the processor, wherein the memory comprises a transaction recurrence application comprising computer-executable program code configured to instruct the processor to perform the functions of the transaction recurrence engine.

Embodiments of the invention further provide a market research method performed by a financial institution comprising using a computerized apparatus to monitor recurrences in financial transactions across a plurality of financial accounts maintained by the financial institution for a plurality of different customers, wherein the computer apparatus is configured to automatically track recurrences in transaction data. In one embodiment, the financial institution comprises a bank, and the plurality of financial account comprises a plurality of bank accounts.

In one embodiment, the market research method further comprises using the computerized apparatus to monitor the recurrences in financial transactions in real time or near real time. In another embodiment, the computerized apparatus is configured to provide output regarding the recurrences in the financial transaction wherein the market research method further comprises generating business strategy recommendations based at least partially on the output.

In one embodiment, the market research method further comprises using the computerized apparatus to monitor the financial transactions, group the financial transactions based on one or more transaction characteristics, and provide market data based on the grouping of the financial transactions. In another embodiment, the one or more transaction characteristics comprise product type, product brand, merchant, transaction amount, or consumer demographic.

In one embodiment, the market research method further comprises using the computerized apparatus to track transaction recurrences as a function of total revenue, transaction frequency, or consumer demographic. In another embodiment, the market research method further comprises providing a subscription to another entity, the subscription permitting the entity to access data gathered by the computerized apparatus pertaining to the recurrences in the financial transactions. In another embodiment, the market research method further comprises identifying partnership, co-branding, advertising, or payment optimization opportunities or strategies based at least partially on data gathered by the computerized apparatus pertaining to the recurrences in the financial transactions.

Embodiments of the invention further provide a market research method comprising: (1) monitoring information associated with a transaction; (2) using a processor to group recurrences of the information where the processor is configured to identify and group transaction recurrences; and (3) storing the recurrences in a computer-readable storage medium. In another embodiment, the information is monitored in real-time.

In one embodiment, the market research method further comprises receiving a request for recurrences based on one or more parameters and outputting the recurrences according to the one or more parameters. In one embodiment, the information about the recurrences is outputted as a graph, chart or table. In another embodiment, the one or more parameters includes a merchant identifier. In another embodiment, the market research method further comprises making a determination based on the outputted recurrences. In one embodiment, the determination comprises a correlation between the transaction and a consumer demographic. In another embodiment, the determination comprises a pricing determination. In a further embodiment, the determination comprises a comparative study. In yet another embodiment, the determination comprises identification of a market trend.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
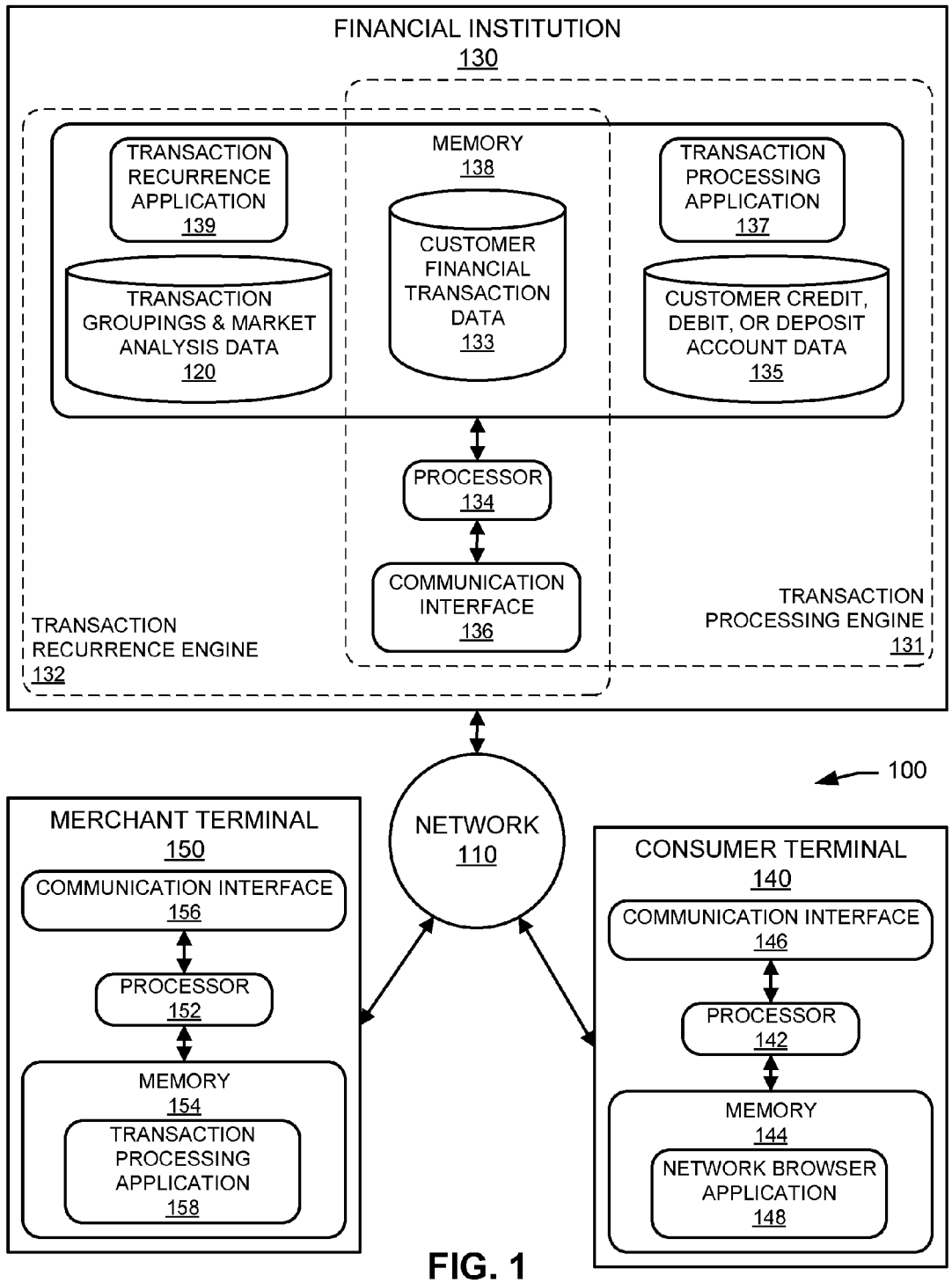
Figure 2:
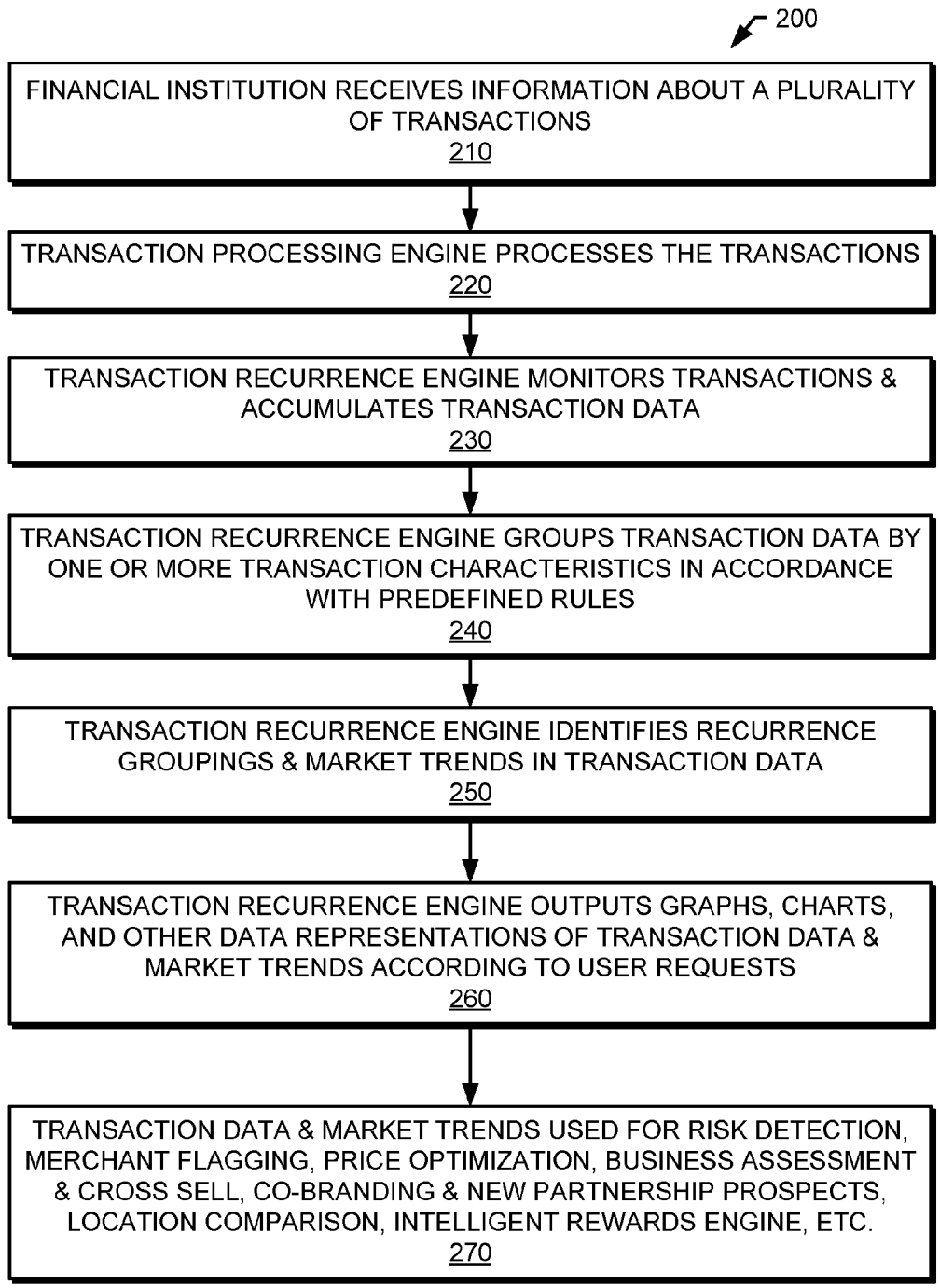
Figure 3A:
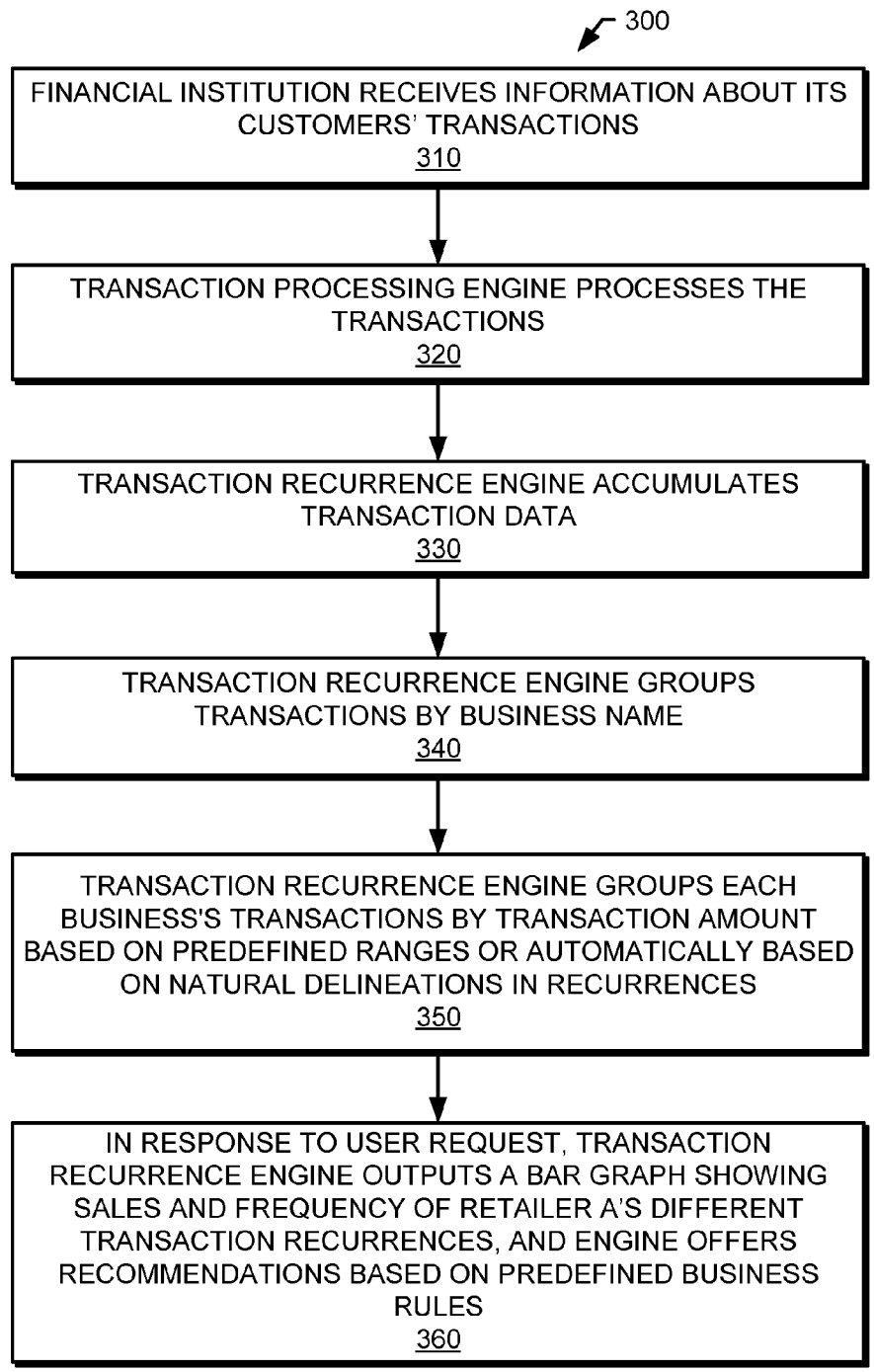
Figure 3B:
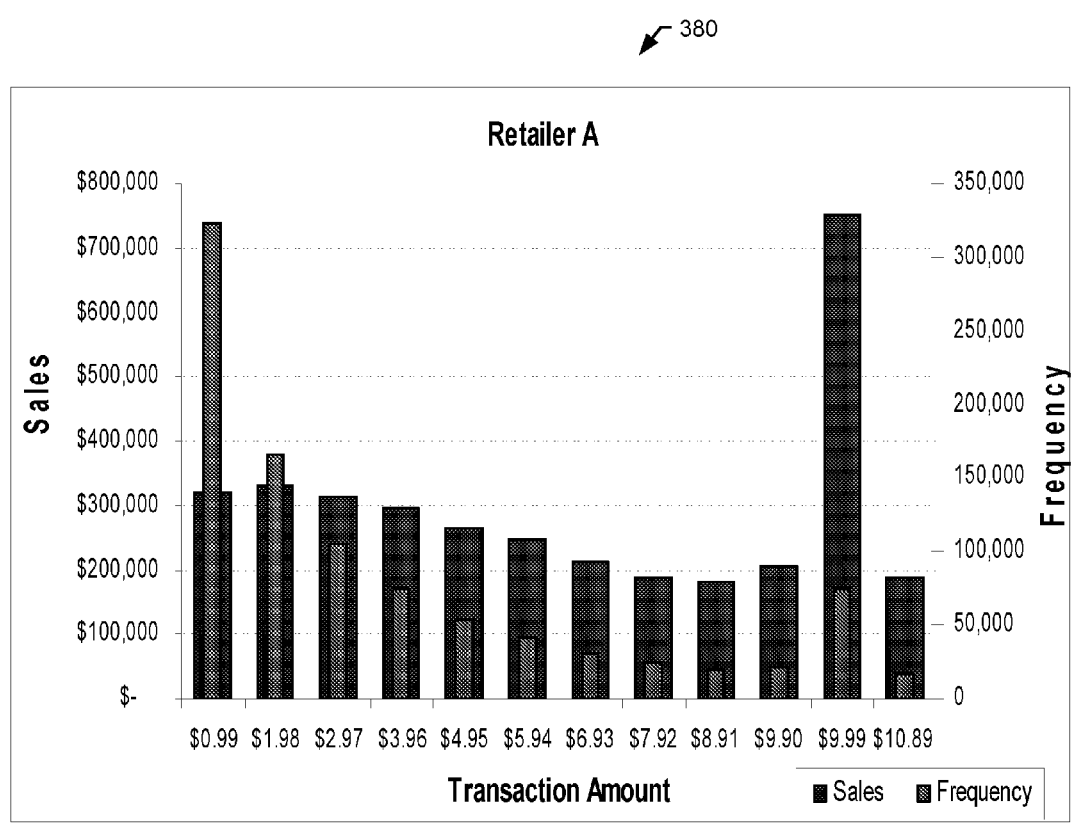

Having thus described embodiments of the present invention in general terms, reference will now be made to the accompanying drawings, which are not necessarily drawn to scale, and wherein:

FIG. 1 provides a block diagram illustrating a market research system, in accordance with an embodiment of the present invention;

FIG. 2 provides a flow diagram illustrating a general process flow of a process performed by the market research system, in accordance with an embodiment of the present invention;

FIG. 3A illustrates a flow diagram illustrating an exemplary process of providing specific market data, in accordance with an embodiment of the present invention;

FIG. 3B illustrates a screen shot of a graphical user interface output from a transaction recurrence engine after performing the process illustrated in FIG. 3A, in accordance with an embodiment of the present invention; and FIG. 4 illustrates another screen shot of a graphical user interface output from a transaction recurrence engine, in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form, and vice versa, unless explicitly indicated otherwise. Also, as used herein, the term "a" and/or "an" shall mean "one or more," even though the phrase "one or more" is also used herein. Like numbers refer to like elements throughout.

Although some of the embodiments of the invention described herein are generally described as involving a "bank," one of ordinary skill in the art will appreciate that other embodiments of the invention may involve other businesses and/or financial institutions that take the place of, or work in conjunction with, the bank to perform one or more of the processes, steps, and/or events described herein as being performed and/or participated in by a bank.

As will be appreciated by one of skill in the art in view of this disclosure, the present invention may be embodied as a method (including, for example, a business process, computer-implemented method, etc.), apparatus (including, for example, a system, computer program product, device, etc.) or a combination of the foregoing. Accordingly, embodiments of the present invention may take the form of an entirely software embodiment (including, for example, firmware, resident software, micro-code, etc.), and entirely hardware embodiment, or an embodiment combining software and hardware aspects that may generally be referred to herein as a "system." Furthermore, embodiments of the present invention may take the form of a computer program product having a computer-readable storage medium having computer-executable program code/computer-readable instructions embodied in the medium.

Any suitable computer-readable medium may be utilized. The computer-readable medium may be, for example but not limited to, a tangible electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device.

Computer program code/computer-readable instructions for carrying out operations of the present invention may be written in an object oriented, scripted and/or unscripted programming languages such as Java, Perl, Smalltalk, C++, SAS, SQL, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods and apparatuses (systems, computer program products, devices, etc.) according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "merchant," as used herein, refers to any person, business, association, machine, apparatus, and/or any other thing capable of selling, offering for sale, distributing, trading, marketing, and/or otherwise dealing in one or more goods and/or services. In some embodiments, the merchant actually produces and/or provides the goods and/or services being sold, while, in other embodiments, the merchant markets and/or distributes the goods and/or services but does not produce and/or provide the goods and/or services. In some embodiments, a merchant is a bank or some other financial institution. In some embodiments, the merchant is a retailer, wholesaler, distributor, or marketer. As used herein, the term "product" refers to a good or service.

The term "consumer," as used herein, refers to any person, business, association, machine, apparatus, and/or any other thing capable of buying, using, consuming, and/or acquiring one or more products from a merchant. In some embodiments, a consumer may be a merchant and/or vice versa. In other embodiments, a consumer may be a customer of a bank or some other financial institution.

The term "customer," as used herein, generally refers to any person, business, association, machine, apparatus, and/or any other thing that buys, uses, consumes, or acquires, or may buy, use, consume, or acquire, a product from a particular party. For example, the term customer is often used herein to refer to a customer of a financial institution. The customer of the financial institution is generally any entity for which the financial institution provides a service or good. For example, the customer of the financial institution may be a customer or a merchant, and the good or service provided by the financial institution may be, for example, a credit or debit card, maintenance of a credit, debit, or deposit account, processing of a financial transaction, and/or the like.

Exemplary transaction data includes information about the product(s) exchanged between the consumer and merchant during transactions. Exemplary transaction data also includes information about the consumer, the merchant, and the transaction itself. For example, in one embodiment, transaction data includes a description of the product(s), the quantity of product(s), and the price of the product(s). Also, for example, in one embodiment, transaction data includes the customer's name and address, bank account number, and credit- or debit-card number and the name of the card-issuing bank. In one embodiment, transaction data also includes, for example, information about the merchant, such as the business name and location, the location where the exchange occurred, the name and routing number of the business-merchant's acquiring bank, and the account number of the business-merchant's account, which is held at the acquiring bank. For illustrative purposes, the transaction data will be described herein as transaction data obtained at a point-of-sale when a consumer purchases a product from a merchant using a credit or debit card (the term "bank card" is used herein to refer to a credit or debit card, and the term "payment device" is used herein to refer to any device capable of communicating a consumer's account information to a merchant so that the merchant can receive payment for a product; such a payment device may or may not be issued by a bank and may be a device other than a card, such as, for example, a non-card device having a radio-frequency identification tag attached thereto and configured to use radio waves to communicate consumer account information to a merchant radio-frequency transceiver). It should be appreciated, however, that the transaction data could be obtained from other types of transactions, including automated clearing house (ACH) payments, online bill pay, paper checks, wire transfers, contactless payments, and cash payments.

In general terms, described herein are various systems, methods, and computer program products for embodiments of a market research system and a transaction recurrence engine used therein. Embodiments of the present invention accurately monitor, analyze, sort, and store transaction data involving merchants and consumers alike and timely provide accurate information that the user can use to make decisions and strategic partnerships such as identifying and determining business opportunities, pricing, trends, risks, growth areas, etc.

Accordingly, some embodiments of the present invention may be particularly useful as a tool for banks, financial institutions, and any other merchants or businesses that have access to transaction data, although the some embodiments can be implemented for any business. As used herein, the term "financial institution" refers to an institution that acts as an agent to provide financial services for its clients or members by processing financial transactions for its clients or members. Financial institutions can include, but are not limited to banks, building societies, credit unions, stock brokerages, asset management firms, savings and loans, money lending companies, insurance brokerages, insurance underwriters, dealers in securities, and similar businesses. Retail, wholesale, and service businesses, as well as manufacturers, may also process financial transactions as disclosed herein. The terms "financial transaction," "financial institution," "bank," and any similar terms are used herein in their broadest sense unless the context explicitly states otherwise.

Financial institutions, such as banks, manage many different types of accounts for consumers, merchants, and other entities, collectively the financial institution's "customers." These accounts may include personal bank accounts, credit or debit accounts, demand deposit accounts and other deposit accounts, investment accounts, etc. Further, these accounts may be for both consumers and merchants alike as it is understood that a merchant may be a customer of a financial institution. Accordingly, financial institutions are privy to many transactions taking place on a daily basis. These transactions may include automated clearing house (ACH) payments, online bill pay, paper checks, wire transfers, contactless payments, cash payments, credit or debit payments (including in-store point-of-sale payments as well as online or other remote payments), etc. In addition to payments, the transactions may include returns, withdrawals (including cash-back transactions), and/or the like. Also, these transactions may take place in various channels including but not limited to telephone, online/Internet (including, for example, networks configured to handle mobile devices), in-store, etc. Accordingly, the transaction recurrence engine will hereinafter be described as being implemented within a financial institution, such as a bank, in accordance with an embodiment of the present invention, although it will be understood in view of this disclosure that other embodiments can be implemented in any business environment, and more particularly, on any system that has access to and/or the ability to monitor transaction data.

FIG. 1 illustrates an exemplary embodiment of a market research system 100 in accordance with an embodiment of the invention. The market research system 100 of FIG. 1 includes a consumer terminal 140, merchant terminal 150, network 110, and financial institution 130. It is understood that, in the following embodiments, unless otherwise indicated, the referenced consumers and merchants may be represented by the consumer terminal 140 and the merchant terminal 150, respectively. In some embodiments, the consumer is the customer of the financial institution 130 and the financial institution 130 maintains the consumer's credit or debit account. In other embodiments, the merchant is the customer of the financial institution 130 and the financial institution 130 maintains the merchant's deposit account. In still other embodiments, the merchant and consumer are both customers of the financial institution 130. It is also understood that, although only one of each party or device such as the consumer terminal 140, merchant terminal 150, etc., is illustrated in the figures, in some embodiments, multiple of each parties or devices exist in the system 100.

As illustrated in FIG. 1, in one embodiment of the invention, the financial institution 130 includes a transaction recurrence engine 132 and a transaction processing engine 131. The transaction processing engine 131 is configured to processes customer financial transactions, such as payments, purchases, returns, withdrawals, deposits, balance inquiries, and/or the like. The transaction processing engine 131 generally includes a communication interface 136, a processor 134, and a memory 138, where the memory 138 includes a transaction processing application 137, a customer account datastore 135, and a customer financial transaction datastore 133 stored therein. The transaction recurrence engine 132 is configured to gather transaction data and group, analyze, store, and present the transaction data and market information gathered therefrom to a user. The transaction recurrence engine 132 generally includes a processor 134, a communication interface 136, and a memory 138, where the memory 138 includes a transaction recurrence application 139, a customer financial transaction datastore 133, and a transaction groupings and market analysis datastore 120.

As already discussed, in the illustrated embodiment of the invention, the transaction recurrence engine 132 resides within the financial institution's computer system 130. In some embodiments, the transaction recurrence engine 132 shares hardware with the transaction processing engine 131, such as the memory 138, processor 134, and communication interface 136. In other embodiments, the hardware is separate for each engine. In this regard, although FIG. 1 illustrates each of the memory 138, processor 134, communication interface 136, and other systems conceptually as a single block, each block in the block diagram may represent a system made up of numerous devices. For example, the processor 134 may include a number of different microprocessors and/or other processing devices. It should also be understood that, in some embodiments of the present invention, the transaction recurrence engine 132 is maintained by an entity other than the financial institution 130, such as, but not limited to, an agent of the financial institution 130 or, for example, a marketing group having an agreement with the financial institution 130 to receive transaction data from the financial institution 130. Regardless of where the transaction recurrence engine 132 resides, at least some embodiments of the invention are configured such that the transaction recurrence engine 132 can, in real time or near real time, receive and monitor transaction data received by the financial institution 130.

The financial institution's communication interface 136 includes the devices used to communicate with other devices on the network 110, such as the merchant terminal 150, the consumer terminal 140, and/or the computer systems of other financial institutions (not shown). The communication interface 136 may include such devices as a modem, server, transceiver, and/or the like. In some embodiments, the communication interface 136 also includes one or more user input and/or output devices for communicating with a user. For example, user input and output devices can include, for example, one or more displays, lights, speakers, microphones, keypads, buttons, touch pads, touch screens, keyboards, pointing devices, and/or the like. For example, the user input devices of the communication interface 136 may be used by a user of the transaction recurrence engine 132 to request specific market data or analysis. The user output devices of the communication interface 136 may then be used by the transaction recurrence engine 132 to display charts, graphs, or other representations of the requested market data or generated from the requested market analysis.

The communication interface 136 is operatively coupled to the processor 134, which instructs the communication interface 136 to perform certain communication functions, and receives and processes communications from the communication interface 136. In this regard, the processor 134 generally includes circuitry used for implementing communication and logic functions of the system in which it resides, here the financial institution's computer system 130. For example, the processor 134 may include one or more digital signal processor devices, microprocessor devices, and/or various analog-to-digital converters, digital-to-analog converters, and other support circuits. Control and signal processing functions of the system in which the processor 134 resides are allocated between these devices according to their respective capabilities. The processor 134 includes functionality to operate one or more software programs based on computer-readable instructions thereof, which are stored in a memory, such as memory 138. For example, in the illustrated embodiment and as described above, the financial institution 130 includes a transaction processing application 137 stored in the memory 138 that the processor 134 can execute in order to process financial transactions initiated, for example, by the merchant terminal 150, the consumer terminal 140, and/or some other device. In the illustrated embodiment and as also described above, the financial institution 130 also includes a transaction recurrence application 139 stored in the memory 138 that the processor 134 can execute in order to analyze the transaction data and display market data gathered therefrom to a user using the communication interface 136.

Naturally, the financial institution 130 is privy to, and facilitates, numerous transactions for its customers. For example, if a customer pays a cable bill online, the financial institution 130 may transfer money, using the processor 134, from the customer's account which may reside in memory 138 to a merchant cable company's account which may also reside in the memory 138 or may reside in the memory of another financial institution. In this example, the customer communicates to the financial institution 130 using a personal computing device, represented in FIG. 1 by the consumer terminal 140, which is connected to the Internet, represented in FIG. 1 by the network 110. The consumer terminal 140 may communicate with the financial institution 130 via each of their respective communication interfaces 136, 146. For example, in one embodiment, the consumer terminal 140 includes a network browser application 148 stored in its memory 144 that, when executed by the processor 142 instructs the processor 142 to send and receive communications from the network 110 using the communication interface 146.

In the above example, the merchant cable company could also be a customer of the financial institution 130 in addition to or as an alternative to the consumer. In such an embodiment, the merchant terminal 150 may be, for example, the computer system that supports the cable company's website which the consumer used, in one example, to submit a payment. The merchant terminal 156 may then process the payment by the processor 152 executing one or more instructions of the merchant's transaction processing application 158 stored in the memory 154. Processing the payment may, in one embodiment, involve using the communication interface 156 to communicate information about the transaction to the financial institution 130. Alternatively, the financial institution 130 may receive information about the transaction from another financial institution, such as the consumer's financial institution or the merchant's financial institution, if other than the financial institution 130.

In some embodiments, the merchant terminal 150 includes a point-of-sale terminal, a cash register, a merchant's payment processing system, an Internet server, a kiosk, a telephone transaction system, a mail transaction system, an automatic payment or deduction system, and/or the like. In some embodiments, the consumer terminal 140 includes a mobile terminal such as a laptop computer, cellular telephone, personal digital assistant, email device, mobile Internet device, a desktop computer, a personal kiosk, a telephone, and/or the like. For example, if a person pays a plumber via check, the financial institution 130 which processes the transaction monitors money being transferred from the customer's account located in memory 138 to a merchant plumber. As another example, if a person purchases a stereo at a retail electronics store, the financial institution 130 may have provided the BIN (Bank Identification Number) for the credit card and accordingly facilitates the transaction where the customer transfers a payment to a merchant retail electronics store. Even if someone pays a bill over the telephone, the financial institution 130 can monitor transaction details.

As a result, embodiments of the financial institution's computer system 130 are able to monitor details concerning almost any transaction on almost any channel. These details may include, for example, type of channel used (telephone, ATM, online/Internet, in-store, etc.), any customer identifiers (e.g., name, address, age, demographic information, etc.), any merchant identifiers (e.g., name, merchant code, industry, address, etc.), location of transaction (e.g., geocodes or other geographic identifiers), transaction amount, date, time, product identifiers or other product-level data (e.g., UPCs, SKUs, other identifying codes, product name, product type, brand name, model, quantity, size, etc), and/or the like. In one embodiment, some or all of this data can be monitored by the transaction recurrence engine 132 on a real-time, or a substantially real-time, basis. For example, in one embodiment, the transaction recurrence engine 132 can monitor transaction details as the transactions are being processed by the transaction processing engine 131, or shortly thereafter, and/or the transaction recurrence engine 132 can monitor transaction details over the communication interface 136 as transactions are processed and reported between the financial institution 130, customer terminal 140, and merchant terminal 150.

FIG. 2 represents a process performed by the market research system 100 in accordance with an embodiment of the present invention. As illustrated by block 210, the financial institution 130 uses its communication interface 136 to receive information about a plurality of transactions from a network 110, such as, for example, a secure financial network or the Internet. As described above, this information may be received from the merchant terminal 150 and/or consumer terminal 140 directly or indirectly through one or more other financial institutions, such as, for example, an issuing bank, acquiring bank, intermediary bank, ACH, credit card payment network, and/or the like where different than the financial institution 130 associated with the transaction recurrence engine 132. In one embodiment, the transaction information is received in the course of the financial institution's 130 direct involvement in processing some aspect of the transaction, such as the authorization of a transaction, the sending or receiving of funds involved in the transaction, and/or the debiting or crediting of an account maintained by the financial institution 130. In some embodiments, transaction information may be received through other mechanisms or channels. For example, in one embodiment, transaction information is received from consumers or merchants uploading transaction receipts to the financial institution 130. More specifically, in one embodiment, customers of the financial institution can upload electronic receipts or scanned copies, or other imaged copies, of paper receipts to the financial institution 130 so that the financial institution 130 can associate the electronic representations of the transaction receipt with the customer's account data 135 and make the electronic representations of the receipts available through an online banking system and gather detailed transaction data therefrom using, for example, one or more known character recognition systems.

As represented by block 220, the transaction processing engine 131 processes the transactions by communicating with one or more other financial institutions, the consumer, and/or the merchant and updating the account data 135 for the account(s) associated with each transaction. As described above, the financial institution 130 may be, for example, the issuing bank that issued a payment device, such as a credit or debit card, used in the transaction, an acquiring bank, an intermediate bank, the merchant's bank, the consumer's bank, etc. Therefore, the financial institution 130 may have some role in processing the transactions. In some embodiments, however, the financial institution 130 receives information regarding a transaction that does not have to be processed by the financial institution 130. For example, as described above, in one embodiment, the financial institution 130 includes systems that permit a customer to upload itemized transaction receipts that the financial institution 130 then associates with the customer's account, even if the transaction did not involve the financial institution 130, such as a transaction paid for by the customer with cash or with a credit or debit card not issued by or associated with the financial institution 130.

As illustrated by block 230, the transaction recurrence engine 132 monitors a plurality of transactions associated with a plurality of accounts maintained by the financial institution 130. As described above, in one embodiment, the transaction recurrence engine 132 resides within the financial institution 130 and accordingly has access to the transaction data 133. The transaction recurrence engine 132 may monitor any and/or all channels through which transaction information may be received by the financial institution 130, including, for example, online/Internet channels, ACH channels, telephone channels, ATM channels, payment networks, point-of-sale terminal channels, etc. Although not shown in the figures, in some embodiments the transaction recurrence engine 132 can monitor third-party data, such as data received from another financial institution or research firm, thereby supplementing its own internal data. It should be appreciated that, although block 230 follows block 220 in FIG. 2, the processes represented by each block may be conducted in the reverse order or simultaneously. In this regard, it is understood that FIG. 2 illustrates one embodiment of the invention and, in other embodiments of the invention, one or more of the process steps illustrated therein may be eliminated, combined with other process steps, or performed in a different order.

As represented by block 240, the transaction recurrence engine 132 then identifies and tracks recurrences amongst the plurality of transactions. For example, in one embodiment the transaction recurrence engine 132 places transactions into one or more groups or "buckets" based on, for example, one or more transaction characteristics. These groupings may be based on predefined or user-defined rules stored in the memory 138, for example as part of the transaction recurrence application 139. The groupings may be based on, for example, such transaction characteristics as the merchant, merchant location, transaction amount, industry, consumer demographic, quantity of product purchased, product, product brand, product manufacturer, and/or any combination of the foregoing or other similar types of transaction characteristics. For example, one recurrence bucket created by the transaction recurrence engine 132 may maintain a record of all transactions processed by the financial institution 130 and involving a purchase of over $500.00 in products from Merchant A. In another example, the transaction recurrence engine 132 may group all transactions for Merchant A together and then have sub-groupings for Merchant A based on product, transaction amount, consumer demographic (e.g., age, gender, economic position, country, state, geographic region, homeowner status, car owner status, family size, marital status, parental status, etc.), and/or the like.

It should be appreciated that, in some embodiments, the transaction recurrence engine 132 provides significant advantages relative to traditional systems for gathering market data, such as market surveys, since the transaction recurrence engine 132, with its ability to monitor the financial transactions processed by a financial institution 130, can gather up-to-date and detailed data about transactions made by many different consumers and many different types of consumers in real time or near real time. Furthermore, in embodiments where the transaction recurrence engine 132 is part of a financial institution's computing system, such as the computing system of a bank, the transaction recurrence engine 132 may have updated, detailed, and accurate information about the demographics of the consumer involved in the transaction. For example, in one embodiment, the transaction recurrence engine 132 is configured to monitor and analyze transaction data received by bank regarding transactions involving customers of the bank for whom the bank maintains a bank account. In such an embodiment, the transaction information monitored by the transaction recurrence engine 132 may include demographic information about the bank's customer involved in the transaction. For example, the bank will likely have demographic information about the customer stored in its databases, such as the geographic location of the customer, the customer's past residences, whether the customer has moved recently, some indication of the customer's economic status (e.g., from the amount of money in the customer's accounts, calculated net worth across a plurality of accounts, whether the customer has and uses a money market account, the customer's mortgage or car payments, etc.), the customer's occupation, and/or the like. The bank may also maintain additional accounts for the customer that yield additional demographic information. For example, in one embodiment, in addition to maintaining some kind of credit or debit account used by a customer in a transaction, the financial institution services the customer's mortgage. In such an example, the transaction recurrence engine 132, in some embodiments, determines from this mortgage account that the customer is a homeowner and includes this demographic information with the other transaction information so that it can be used to determine, for example, whether homeowners are more likely than non-homeowners to engage in the particular transaction. In another example, the customer uses the financial institution and the customer's account maintained thereby to make mortgage or car payments to another financial institution and, from this information, the transaction recurrence engine 132 can determine that the customer is a homeowner or car owner. In another exemplary embodiment, the transaction recurrence engine 132 can determine whether the customer is likely married by, for example, recognizing that at least one of the customer's accounts is a joint account with a person having the same last name.

It should be noted that, naturally, in some embodiments, information that can be used to identify a particular customer of the financial institution or information that should be kept confidential, such as social security numbers, names, street addresses, etc., may not be available to the transaction recurrence engine 132 and/or to the users of the transaction recurrence engine 132 in some instances, depending on the purpose of the transaction recurrence engine 132, customer permissions and agreements, applicable privacy laws and policies, and/or the users of the transaction recurrence engine. In one embodiment, the transaction recurrence engine 132 categorizes and stores the transaction groupings in a datastore 120 in the memory 138 so that all of the data resides within the financial institution 130, thereby reducing any perceived security threat or privacy concern since the transaction data is within the security of the financial institution 130. Further, since this data is stored within the memory 138, the transaction recurrence engine 132 can provide historical data regarding transaction recurrences and map and identify historical trends when needed.

As illustrated by block 250, the transaction recurrence engine 132 then identifies transaction recurrence groupings and market trends in each group of transactions that share a common characteristic and/or identifies market trends by comparing one or more groups of transactions with one or more other groups of transactions. In some embodiments, the transaction recurrence engine 132 identifies these sub-groupings, trends, recurrences, comparisons, correlations, etc. automatically based on one or more predefined rules of the transaction recurrence application 139, while, in other embodiments, they are generated based on user defined rules and/or commands.

As illustrated by block 260, the transaction recurrence engine 132 then provides output based on the identified recurrences, groupings, correlations, market trends, etc. The output may take the form of any type of communication with another system, device, application, user, and/or other entity. In some embodiments, the output is text based, such as an email to a predefined party whenever a certain market occurrence or trend arises, such as an email alert to a particular user each time a new merchant is identified that has over a certain number of customers making transactions with the new merchant. In other embodiments, the output is graphical, such as a graph, chart, table, or other data representation displayed on the screen of a user terminal. For example, if a user requests sales frequency information for Merchant B's Product A, the financial institution 130 can provide the requested recurrence using, for example, a graphical user interface (GUI). The transaction recurrence engine 132 may retrieve the requested recurrence from the memory 138 and, using the processor 134, output the recurrence in the requested form using the communication interface 136, as represented by block 260. In one embodiment, the transaction recurrence engine 132 generates outputs automatically based on preprogrammed rules existing in the transaction recurrence application, while, in other embodiments, the transaction recurrence engine 132 generates output based on user defined rules or other user input. In still other embodiments, the output is an electronic communication to another system or even to another portion of the transaction recurrence application 139 so that the other system or portion can use the data to take a certain action or perform additional analysis.

In one embodiment, a user may query the transaction recurrence engine 132 to output requested data. In one embodiment, the user is a member of the financial institution 130. In other embodiments, the user is another party, such as a merchant, marketing company, consumer group, or the like, that is granted access to the transaction groupings and market analysis data 120 by, for example, purchasing a subscription to the service. As described in greater detail below, the recurrence data 120 can be put to many uses as determined by the transaction recurrence engine 132 and this data can be used by the financial institution 130 or others. For example, in one embodiment, a merchant may connect directly to the transaction recurrence engine 132 from merchant terminal 150 over the network 110, such as the Internet, and query the transaction recurrence engine 132 to determine recurrence data or any other transaction data that the merchant may need. This is accomplished using the communication interface 156 residing within merchant terminal 150 to communicate over the network 110 with the communication interface 136 residing within the financial institution 130. More specifically, in one embodiment, the merchant terminal 150 uses a web browsing application (not shown) stored in its memory 154 to communicate, via a secure Internet connection, with a server of the transaction recurrence engine 132. As is also described in greater detail below, any resulting outputs in the form of displayed data, graphs, charts, etc., may be sent to the merchant terminal 150 from the communication interface 136 and displayed at the merchant terminal 150 using its processor 152 and user output device of its communication interface 156. In another embodiment, a customer may connect to and query the transaction recurrence engine 132 through, for example, the customer's telephone (e.g., consumer terminal 140) over the network 110, such as a telephone network, to determine, for example, all purchases made at Merchant A within a specified time frame.

As represented by block 270 in FIG. 2, the transaction data and identified market trends can then be used for numerous different purposes. For example, the data may be used for risk detection, merchant flagging, price optimization, business assessment, cross selling, identifying new partnership opportunities, comparing product sales from one location or region to another, providing intelligent rewards, etc. These uses may be made by a user of the transaction recurrence engine 132 or, in some embodiments, may be made by the transaction recurrence engine 132 automatically in accordance with predefined rules for identifying, for example, cross selling and partnership opportunities from the data and automatically notifying a particular person of the opportunities or by automatically developing a new or revised pricing schedule based on the market data that will increase revenue but go largely unnoticed.

FIG. 3A illustrates a flow diagram illustrating an exemplary process 300 of providing specific market data, in accordance with one exemplary embodiment of the present invention. FIG. 3B illustrates a screen shot 380 of a graphical user interface output from a transaction recurrence engine after performing the process illustrated in FIG. 3A, in accordance with one exemplary embodiment of the present invention.

Referring to block 310 in FIG. 3, the financial institution 130 receives information about its customers' transactions. As described above, in one embodiment the financial institution 130 is a bank that maintains one or more bank accounts (e.g., credit accounts, debit accounts, etc.) for its customers. The bank may receive information about a customer's transaction by, for example, receiving an authorization request electronically from another financial institution or system, the authorization request requesting authorization for a particular transaction, such as a credit or debit card purchase. As described above, the information received by the financial institution 130 may include such information as the merchant involved in the transaction (including, for example, the merchant's name, address, etc.), the consumer involved in the transaction, the transaction account, the product(s) purchased or returned in the transaction, the date and time of the transaction, the channel through which the transaction was made (e.g., the Internet, in-store, mail order, telephone, ATM, kiosk, etc.), an itemized receipt, the type of bank account or payment device used, etc. In the embodiment illustrated in FIGS. 3A and 3B, the financial institution 310 receives at least the total transaction amount and the name of the merchant. It should be appreciated that this information could be received by the financial institution 132 if it maintains the consumer's account involved in the transaction and/or if it maintains the merchant's account involved in the transaction. In other words, the merchant and/or the consumer may be the financial institution's customer. In one embodiment, the transaction recurrence application 139 includes logic to account for any duplicates in the transaction data resulting from situations where both the merchant and the consumer are customers of the financial institution 130 so that such transactions are not counted twice.

As represented by block 320, the transaction processing engine 131 uses the information received about the transaction to process the transaction for the customer. For example, where the customer is the consumer involved in the transaction, the transaction processing engine 131 may process the transaction by checking to see if the customer has sufficient funds in the customer's bank account, authorizing the transaction if there is sufficient funds available in the customer's account, and transferring the funds for the transaction amount to the merchant's financial institution to be deposited in the merchant's deposit account with that institution.

As represented by block 330, the transaction recurrence engine 132 accumulates transaction data over a period of time. In one embodiment, the transaction processing engine 131 stores all of the transaction data in a datastore 133 in memory 138 and the transaction recurrence engine 131 merely accesses this datastore 133 to obtain the transaction information that it needs for its analysis. In other embodiments, the transaction recurrence engine 132 obtains the transaction information it needs during the processing of the transaction and stores it in the datastore 133.

As represented by block 340, in the illustrated embodiment, the transaction recurrence engine 132 groups transactions by the name of the merchant. For example, in one embodiment, the transaction recurrence engine 132 groups all of the consumer transactions together that involve purchasing a product from a particular merchant, "Merchant B."

As represented by block 350, in the illustrated embodiment, the transaction recurrence engine 132 then groups all of the transactions involving purchasing a product from Merchant B by transaction amount. In one embodiment, the transaction recurrence engine 132 automatically determines amount ranges by which to group the transactions based on predefined rules or by applying rules to determine natural groupings and breaks in the transaction amount. In another embodiment, the transaction amount ranges used for grouping the transactions are based on user input. For example, referring to the example illustrated in FIG. 3B, Merchant B's transactions are grouped by different transaction amounts. In the illustrated embodiment, these are the only transaction amounts for transactions involving Merchant B. Such may be the case in situations where Merchant B has a limited number of products and a standard pricing schedule. In other embodiments, these represent ranges (e.g, $0.00-$0.99, $0.99-$1.98, etc.), as opposed to exact amounts, that were defined by the user or were predefined by certain rules. In still another embodiment, the transaction recurrence engine 132 identifies natural groupings and breaks in the data and then generates its own ranges to correspond with these natural breaks so that market trends can be determined by comparing the different groupings. For example, in one embodiment, the transaction recurrence engine 132 analyzes the transaction data and automatically identifies that there is a spike in the frequency of transactions involving amounts in the range of $9.90-$9.99. In such an example, the transaction recurrence engine 132 may group these transactions together to focus on a particular market trend or phenomenon.

As represented by block 360, in response to a user's request for transaction information regarding the sales of Merchant B, the transaction recurrence engine displays for the user a bar graph showing total sales and transaction frequency as a function of transaction amount. FIG. 3B illustrates an exemplary bar graph 300 showing the transactions of Merchant B in terms of sales and frequency as a function of transaction amount. As the graph shows, Merchant B has a high frequency of $0.99 transactions, but these transactions result in a proportionately low revenue amount. On the other hand, the graph shows that although lower in frequency, Merchant B's $9.99 sales result in a very high revenue amount. Accordingly, the transaction recurrence engine 132 can provide this transaction data to any party requesting it, such as, for example, one or more financial institutions 130, merchants and other customers, thereby allowing them to use the data in ways that will be described hereinafter.

For example, with the transaction recurrence engine's output as shown in FIG. 3B, the financial institution 130 may, for example, improve its pricing offerings since the transaction recurrence engine 132 may both identify merchants which are popular and also which particular type of transaction is popular for a certain merchant. Interchange payments (i.e., payments charged to merchants by banks or other financial institutions to process certain financial transactions, such as debit or credit card transactions) are often cited as a potential deterrent to a merchant's revenue margins. Traditionally these payments are a flat amount for all transaction or a flat percentage for all transactions. In embodiments of the present invention, the financial institution 130 may use output as shown in FIG. 3B to determine tiered pricing, as opposed to a flat rate, that will improve goodwill between the merchant and the financial institution 130, while keeping the financial institution's own interchange revenue intact or not significantly changed. For example, as illustrated in FIG. 3B, in one example Merchant B's highest frequency corresponds to $0.99 transactions. The financial institution 130 may provide a more attractive payment schedule to the merchant by reducing the interchange payment for these high frequency transactions by some amount, but the financial institution 130 may still break even or improve revenue streams by increasing the payment for lower frequency but higher revenue transactions, which may be more palatable to the merchant. Accordingly, the transaction recurrence engine 132 enhances and optimizes the pricing process through differential pricing by giving the requesting party such as a financial institution 130 a clear view of how it can generate revenue through better pricing. In one embodiment, the transaction recurrence engine 132 automatically identifies areas where the financial institution 130 may want to consider differential pricing and may automatically suggest one or more pricing schedules based on the trends it identifies in the transaction data and certain business rules. For example, the transaction recurrence engine 132 may be configured to automatically recommend differential pricing wherever lower frequency transactions yield a significantly higher revenue for a merchant than the revenue received by the merchant for significantly higher frequency transactions.

The transaction recurrence engine 132 may also be used to make business recommendations based on quantified recurrent transaction pattern behavior of customers. For example, if a financial institution 130 is processing thousands of recurrent transactions from its customers that involve the customer transferring money from the customer's demand deposit account with the financial institution 130 to a money market account with another competing financial institution, the transaction recurrence engine 132 may provide intelligent insights into the most popular savings amounts and competitors. Accordingly, with the transaction recurrence engine's information and outputs, the financial institution 130 may be able strategize and determine how it can be competitive and enter that transaction amount space or it may provide consulting services to others who may attempt to use such information. For example, if the transaction recurrence engine 132 identifies that customers are allocating installments of around $1000.00 per month to a particular competing financial institution, the financial institution 130 can strategize and determine specific interest rate schedules, minimum deposits, and other options that it can provide for potential customers in order to convince the customers to deposit the $1000.00 per month into the financial institution's accounts rather than a competitor's accounts. In one embodiment, the transaction recurrence engine 132 can identify such trends automatically and provide alerts to certain users when a certain number of transactions during a particular period of time and for a particular amount are made involving a common competitor or other business entity.

Similarly, in another embodiment, the transaction recurrence engine 132 may monitor new merchants, which may or may not be competitors, entering the financial institution's 130 payment schema. This information may allow the financial institution 130 to study economic trends, associated risks, and merchant prospecting opportunities. The transaction recurrence engine 132 may also help to manage relationships with merchants. For example, using the transaction recurrence engine 132, a financial institution 130 can determine merchants with whom its products can be offered, and thus, establish a relationship with the merchant to explore partnership and/or co-branding opportunities.

For example, if a financial institution 130 determines from the transaction recurrence engine 132 that many of its customers are using the services provided by Merchant A, after the transaction recurrence engine 132 identifies the merchant, the financial institution 130 may determine that since its customers already use Merchant A's services, it may be beneficial to enter into some sort of agreement such as a co-branded credit or debit card agreement with Merchant A to benefit all parties involved.

In some embodiments, the transaction recurrence engine 132 may provide insight into rewards and other incentive programs tailored to specific customers based on popular trends and customer behavior. For example, the transaction recurrence engine 132 uniquely helps, for example, the financial institution 130 understand customer needs. By detecting frequency of transaction, amount, location, etc., the transaction recurrence engine 132 provides the financial institution 130 insight into, for example, what its customers buy and where they buy it. As an example, if the transaction recurrence engine 132 determines that a customer uses a certain merchant frequently, it can determine that rewards programs and similar loyalty points can result in merchant points for the customer. In this embodiment, since customer trends and popular trends can be narrowed down to the customer level, all marketing, media, mailings, etc., can be more narrowly tailored to suit that specific customer or specific customer group's wants and needs. In this embodiment, the transaction recurrence engine 132 may help save the business or, for example, financial institution 130 money by not wasting mailings, advertisements and more effectively directing these and customer loyalty programs towards the specific customer or group.

In another embodiment, the transaction recurrence engine 132 can be used as a detection system to, for example, detect risks and gain quick insights from transaction patterns. For example, as discussed above, the transaction recurrence engine 132 has the ability to create recurrence buckets or groupings. If, for example, the transaction recurrence engine 132 groups transaction amounts for a given merchant, it can provide insight into economic trends and customer habits. One example is a merchant that provides services to help homeowners through potential underpayment of home loans and help them walk away from the mortgage. If the transaction recurrence engine 132 provides notice of increasing transactions between a customer and such a merchant, it may help the financial institution 130 to flag and identify potential underpayment of home loans risks for mortgages and other home loans originating from or serviced by the financial institution 130.

In another example, the transaction recurrence engine 132 may help perform real-time comparative studies of different merchants. The utility is further underscored by the transaction recurrence engine's ability to perform this for merchants within the same industry. For example, the transaction recurrence engine 132 could analyze recurrence buckets for the video rental industry. For example, it could analyze merchants X, Y, and Z—all competitors within the rental industry category. The transaction recurrence engine 132 may provide respective market shares and a comparison of these market shares over time. For example, the transaction recurrence engine 132 may detect a high rate of increase in single movie rental recurrences for Merchant X (e.g., a mail-order movie company) along with a corresponding decrease in single movie rentals for Merchant Y (e.g., a traditional brick and mortar movie store). Such exemplary data may show a trend in consumer preferences from one type of business model to another type of business model. This analysis can be done for industries or merchants across the country or it can be narrowed down to states, cities, counties, neighborhoods, zip codes, etc. using spatial cluster recurrence. This capability provided by the transaction recurrence engine 132 is dynamic and can be used for internal purposes or can be used to provide third-party consultation services in the form of, for example, market studies, etc.

The transaction recurrence engine 132 can also help target potential merchant clients for a financial institution. FIG. 4 illustrates a screen shot 400 of a graphical user interface output chart from the transaction recurrence engine 132 which illustrates the transaction recurrence engine's 132 ability to provide historical data to chart customer spending habits. The transaction recurrence engine 132 tells the requesting party whether customer spending trends are increasing or decreasing and can do this for individual merchants as well. When viewed for specific merchants, the requesting party such as the financial institution 130 can determine which merchants are gaining a larger market share, thereby indicating growth opportunities, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:
1. An apparatus comprising:
a computer processing device;
a transaction processing engine configured to instruct said computer processing device to process financial transactions involving a plurality of financial accounts owned by a plurality of different individuals; and a transaction recurrence engine configured to instruct a computer processing device to:
monitor the financial transactions;
track transaction recurrences occurring amongst the financial transactions;
determine a payment optimization opportunity with a particular merchant based at least partially on the transaction recurrences occurring amongst the financial transactions, wherein the payment optimization comprises, at least, differential or tiered pricing of high volume or high dollar transactions for the particular merchant;
update, in real time, the payment optimization opportunity based, at least partially, on new financial transactions being processed by the transaction processing engine; and
output an indication of the payment optimization opportunity.

2. The apparatus of claim 1, further comprising: a memory having information about the plurality of financial accounts stored therein, wherein the plurality of financial accounts comprises a plurality of bank accounts.

3. The apparatus of claim 1, wherein the transaction recurrence engine is configured to instruct a computer processing device to analyze market data and provide business strategy recommendations to a user based on the analysis of the market data.

4. The apparatus of claim 1, wherein the transaction recurrence engine is configured to instruct a computer processing device to monitor the financial transactions, group the financial transactions based on one or more transaction characteristics, and provide market data based on the grouping of the financial transactions.

5. The apparatus of claim 4, wherein the one or more transaction characteristics comprise product type, product brand, merchant, transaction amount, or consumer demographic.

6. The apparatus of claim 4, wherein the transaction recurrence engine is configured to instruct a computer processing device to compare one or more transaction recurrence characteristics of a first group of financial transactions with the one or more transaction recurrence characteristics of a second group of financial transactions.

7. The apparatus of claim 6, wherein the one or more transaction recurrence characteristics comprise total revenue, transaction frequency, or consumer demographic.

8. The apparatus of claim 4, wherein the transaction recurrence engine is configured to instruct a computer processing device to compare transaction frequency of a first group with transaction frequency of a second group of financial transactions.

9. The apparatus of claim 1, wherein the transaction recurrence engine is further configured to instruct a computer processing device to track transaction recurrences as a function of total revenue, transaction frequency, or consumer demographic.

10. The apparatus of claim 1, wherein the transaction recurrence engine is configured to receive user input and provide output based at least partially on the user input.

11. The apparatus of claim 10, wherein the transaction recurrence engine is configured to instruct a computer processing device to receive user input from and provide output to users having a subscription to a transaction recurrence engine service.

12. The apparatus of claim 1, wherein the transaction recurrence engine is configured to instruct a computer processing device to identify market trends or natural clusters of transaction recurrences based on transaction recurrence data and one or more rules stored in a memory, and wherein the output is based at least partially on the identified market trends or natural clusters of transaction recurrences.

13. The apparatus of claim 1, wherein the transaction recurrence engine is configured to instruct a computer processing device to provide a user with a graphical user interface and use the graphical user interface to display output in the form of a graph, chart, or table.

14. The apparatus of claim 1, wherein the output comprises an indication that at least one of the plurality of different individuals is likely to take a certain action, and wherein the indication is based at least partially on the transaction recurrences.

15. The apparatus of claim 1, wherein the output comprises an indication of a partnership or co-branding opportunity, and wherein the indication is based at least partially on the transaction recurrences.

16. The apparatus of claim 1, wherein the output comprises a suggested payment schedule for interchange payments with a particular merchant, and wherein the payment schedule is based at least partially on the transaction recurrences.

17. The apparatus of claim 16, wherein the transaction recurrence engine is further configured to instruct a computer processing device to update, in real time or near real time, the suggested payment schedule for interchange payment with the particular merchant based at least partially on new financial transactions being processed by the transaction processing engine.

18. A method performed by a financial institution, the method comprising:
using a computerized apparatus to:
monitor recurrences in financial transactions across a plurality of financial accounts maintained by the financial institution for a plurality of different customers;
automatically track recurrences in transaction data;
determine an indication of a payment optimization opportunity with a particular merchant based at least partially on the transaction recurrences in the transaction data, wherein the payment optimization comprises, at least, differential or tiered pricing of high volume or high dollar transactions for the particular merchant;
update, in real time, the indication of the payment optimization opportunity based, at least partially, on new financial transactions being processed by the transaction processing engine; and
output an indication of the payment optimization opportunity.

19. The method of claim 18, wherein the financial institution comprises a bank, and wherein the plurality of financial accounts comprises a plurality of bank accounts.

20. The method of claim 18, wherein the computerized apparatus is configured to provide output regarding the recurrences in the financial transactions, and wherein the method further comprises: generating business strategy recommendations based at least partially on the output.

21. The method of claim 18, further comprising using the computerized apparatus to monitor the financial transactions, group the financial transactions based on one or more transaction characteristics, and provide market data based on the grouping of the financial transactions.

22. The method of claim 21, wherein the one or more transaction characteristics comprise product type, product brand, merchant, transaction amount, or consumer demographic.

23. The method of claim 18, further comprising using the computerized apparatus to track transaction recurrences as a function of total revenue, transaction frequency, or consumer demographic.

24. The method of claim 18, further comprising: providing a subscription to another entity, the subscription permitting the entity to access data gathered by the computerized apparatus pertaining to the recurrences in the financial transactions.

25. The method of claim 18, further comprising: identifying partnership, co-branding, advertising or strategies based at least partially on data gathered by the computerized apparatus pertaining to the recurrences in the financial transactions.

26. A computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
monitoring information associated with a transaction;
grouping recurrences of said information to identify and group transaction recurrences;
storing said recurrences in a computer-readable storage medium;
determining a payment optimization opportunity with a particular merchant based at least partially on the transaction recurrences, wherein the payment optimization comprises, at least, differential or tiered pricing of high volume or high dollar transactions for the particular merchant;
updating, in real time, the indication of the payment optimization opportunity with the particular merchant based, at least partially, on new financial transactions data being processed by the transaction processing engine; and
outputting an indication of the payment optimization opportunity.

27. The computer implemented method of claim 26, further comprising computer readable medium comprising configured computer program instruction code, such that when said instruction code is operated by said computer processing device, said computer processing device performs the following operations: receiving a request for recurrences based on one or more parameters; and outputting said recurrences according to said one or more parameters.

28. The computer implemented method of claim 27, wherein information about the recurrences is outputted as a graph, chart, or table.

29. The computer implemented method of claim 27, wherein said one or more parameters includes a merchant identifier.

30. The computer implemented method of claim 27, further comprising computer readable medium comprising configured computer program instruction code, such that when said instruction code is operated by said computer processing device, said computer processing device performs the following operations: making a determination based on said outputted recurrences.

31. The computer implemented method of claim 30, wherein the determination comprises a correlation between the transaction and a consumer demographic.

32. The computer implemented method of claim 30, wherein the determination comprises a pricing determination.

33. The computer implemented method of claim 30, wherein the determination comprises a comparative study.

34. The computer implemented method of claim 30, wherein the determination comprises identification of a market trend.

* * * * *